United States Patent
Guillet et al.

[15] 3,663,087
[45] May 16, 1972

[54] DEVICE FOR IMPROVING THE HOMOGENEITY OF A LASER BEAM

[72] Inventors: Hubert Guillet; Louis Jacob, both of Saint Germain les Arpajon; Jacques Mouchart, L' Hay les Roses; Bernard Sturel, Saint Michel sur Orge, all of France

[73] Assignee: Commissariat a l'Energie Atomique, Paris, France

[22] Filed: Jan. 16, 1970

[21] Appl. No.: 3,465

[30] Foreign Application Priority Data

Jan. 28, 1969 France..................................6901702
Mar. 19, 1969 France..................................6907825

[52] U.S. Cl..............................350/150, 331/94.5, 350/151, 350/157, 350/175 DR
[51] Int. Cl...........................................................G02f 1/20
[58] Field of Search.............................350/150-151, 157, 350/175 DR, 179; 331/94.5

[56] References Cited

UNITED STATES PATENTS

| 3,411,840 | 11/1968 | Robinson.............................350/151 |
| 3,560,875 | 2/1971 | Macken................................331/94.5 |
| 3,484,714 | 12/1969 | Koester et al........................331/94.5 |
| 3,499,701 | 3/1970 | Macek et al..........................350/150 |
| 3,461,402 | 8/1969 | Dumanchin.....................350/150 UX |
| 3,420,601 | 1/1969 | Young et al. .........................350/151 |

FOREIGN PATENTS OR APPLICATIONS

| 1,551,448 | 12/1968 | France................................350/150 |
| 1,173,033 | 12/1969 | Great Britain.......................350/150 |

Primary Examiner—David Schonberg
Assistant Examiner—Paul R. Miller
Attorney—Craig, Antonelli, Stewart and Hill

[57] ABSTRACT

The device for improving the homogeneity of a light beam and especially a laser beam comprises an element having radially variable rotatory power and two polarizers placed on each side of said element on the path of the beam.

12 Claims, 4 Drawing Figures

PATENTED MAY 16 1972  3,663,087

INVENTOR

HUBERT GUILLET, LOUIS JACOB,
JACQUES MOUCHART and BERNARD STUREL

Craig, Antonelli, Stewart & Hill
ATTORNEYS

//3,663,087

DEVICE FOR IMPROVING THE HOMOGENEITY OF A LASER BEAM

This invention relates to a device for improving the homogeneity of a light beam and more particularly of a laser beam.

It is well known that, by reason of the absorption of light by the laser rods themselves, optical pumping of the rods is usually much lower at the center than at the periphery, thereby resulting in a cup-shaped radial distribution of excited ions in a cylindrical rod at the end of optical pumping. It is said that the "shell" of the rod is more highly pumped than its "core." The density of population inversion which is proportional to the energy density stored at the time of pumping therefore decreases rapidly from the side walls towards the center and the emitted power is therefore practically concentrated in a ring at the periphery of the rod. In the case of an amplifying chain, the phenomenon develops at each stage, with the result that the light intensity of the beam has a radial distribution which progressively increases towards the side walls. Since the power flux per unit area is limited by the threshold of fracture of the material, it is thus necessary to make use of active rods having a diameter which is much larger than would otherwise be necessary if the distribution of energy were uniform.

In order to improve the homogeneity of the laser beam in an amplifying chain, it has been proposed to interpose between two rods an afocal system having an absorbent diverging lens, the thickness of absorbent material traversed by the beam being intended to increase from the axis to the periphery. However this solution has the disadvantage of causing substantial attenuation of the laser beam. It has also been proposed to compensate for the radial variation in density of population inversion produced by pumping of a laser rod by causing a radial variation which is inversely proportional to the length of material traversed by the different light rays constituting the flux to be amplified so that the gain produced by said rod should be uniform throughout its section. One of the rod ends is therefore ground in such a manner that the length of said rods should decrease from the center towards the periphery.

The present invention proposes another solution which prevents substantial attenuation of the laser beam and does not entail the need for any special cutting or grinding of rod ends.

More specifically, the invention relates to a device for improving the homogeneity of a light beam, said device being mainly characterized in that it comprises an element having radially variable rotatory power and two polarizers placed on each side of said element on the path of said beam.

Further properties of the present invention will be brought out by the following description in which a number of alternative embodiments of the device aforesaid are given by way of explanation but not in any sense by way of limitation, reference being made to the accompanying drawings, wherein.

Figure 1:
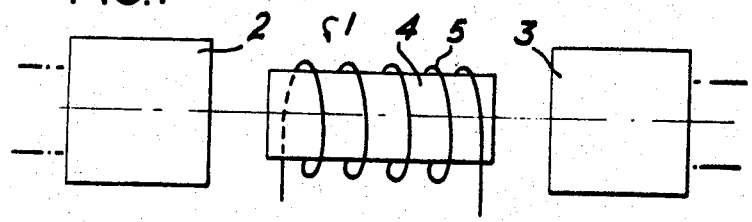
FIG. 1 represents a device according to the invention which makes use of a Faraday rotator.

A first method of correcting inhomogeneity of a laser beam consists in accordance with the invention in employing as shown in FIG. 1 a Faraday rotator 1 which is inserted between two polarizers 2 and 3 having planes of polarization which are crossed at an angle of 90°. The Faraday rotator 1 is constituted by a material 4 having a Verdet constant such as lead glass, for example, and by a solenoid 5 which is disposed coaxially with said material and intended to produce a magnetic field within this latter. Under these conditions, as a laser beam which is polarized by the polarizer 2 passes through the material 4 which is subjected to the magnetic field produced by the solenoid 5, said beam undergoes a rotation of its plane of polarization through an angle $\alpha$ having a value which is given by the relation:

$$\alpha = K L B,$$

wherein $K$ is the Verdet constant of the material 4, $L$ is the length of material traversed by the beam and $B$ is the intensity of the magnetic field produced.

In point of fact, since the magnetic field produced by a solenoid does not have a uniform value within the space which is formed by the turns of the solenoid but increases in relation to the distance from its axis of symmetry, the plane of polarization of the laser beam does not rotate through the same angle at all points. On a line in which the magnetic field has the value $B_r$, the angle of rotation is:

$$\alpha = K L V_r$$

It is therefore apparent that, by reason of the shape of revolution of the material 4 and of the solenoid 5, the lines of equal rotation are concentric circles and the angle of rotation becomes smaller as the distance from the axis of said solenoid becomes greater.

In consequence, if the solenoid 5 is energized by means of a current such that the field $B_r$ on the axis causes a rotation of the plane of polarization of the light through an angle in the vicinity of 90°, a ray which coincides with the axis is transmitted by the polarizer 3 practically without attenuation inasmuch as its plane of polarization is substantially parallel to that of said polarizer. On the other hand, as the distance from the axis becomes greater, so the difference between the plane of polarization of rays and the plane of polarization of the polarizer 3 increases, with the result that the light is attenuated to a progressively greater extent.

Thus, the Faraday rotator 1 exhibits optical rotatory power which decreases from the center towards the periphery and constitutes in conjunction with the crossed polarizers 2 and 3 a system in which the transmitted light also decreases from the center towards the periphery. A laser beam whose intensity decreases in the opposite direction, namely from the periphery towards the center is therefore subjected as it passes through this system to an attenuation which increases as the distance from the axis becomes greater so that said beam exhibits better homogeneity at the exit of the polarizer 3.

Inasmuch as this system is open only when the material 4 is subjected to a magnetic field, it is apparent that it can additionally constitute a shutter for chopping laser pulses which have a high amplitude, namely which exhibit a steep leading edge or fast rise time. In fact, when the solenoid 5 is not energized, the light passes through the material 4 without any change in polarization with the result that said light is not transmitted by the polarizer 3 whose plane of polarization is crossed with the plane of the first polarizer 2. It is therefore only necessary to apply the magnetic field at the instant of appearance of a laser pulse at the level of said material in order to obtain at the exit of the second polarizer a high-amplitude pulse which has a practically homogeneous energy distribution.

Figure 2:
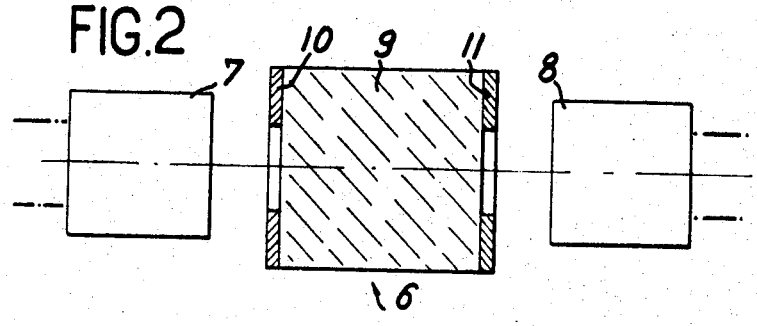
FIG. 2 illustrates a device according to the invention which makes use of a Pockels cell.

A second method of correcting inhomogeneity of a laser beam consists in accordance with the invention in employing as shown in FIG. 2 an axial-field phase-shifting electrooptical cell 6 which is inserted between two polarizers 7 and 8 having planes of polarization which are crossed at 90°.

The cell is advantageously a Pockels cell constituted by a crystal 9 of potassium monophosphate (abbreviated to KDP) or ammonium monophosphate (abbreviated to ADP) which is placed between two annular electrodes 10 and 11 so that its principal crystallographic axis should be substantially parallel to the lines of force of the electric field produced by said electrodes. The plane of polarization of the first polarizer is inclined at an angle of 45° to the axes which are induced in said crystal as a result of the Pockels effect.

It is apparent that when a potential difference is applied between the two electrodes 10 and 11 by reason of the annular shape of these latter, the resultant electric field is not uniform within the crystal 9 : said field increases from the axis of the cell to the periphery of this latter. This non-uniform distribution of the lines of force is profitably employed in order to compensate for inhomogeneity of a laser beam. In fact, there is applied between the electrodes 10 and 11 a voltage such that, in the case of a light ray having a wavelength $\lambda$ which coincides with the axis, the optical path difference $cr$ produced as a result of passage through the crystal 9 between two waves which are polarized along the axes induced by the Pockels effect is $\lambda/2$. By reason of the non-uniformity of the electric field which causes this effect, the optical path difference therefore increases from this minimum value when the distance from the axis becomes greater. In consequence, an incident light ray which is polarized by the polarizer 7 and passes through the cell 6 along the axis of this latter is subjected therein to a rotation of its plane of polarization through an angle of 90°, with the result that said ray is transmitted by the polarizer 8 practically without attenuation inasmuch as its plane of polarization is then parallel to that of said polarizer. On the other hand, as the distance from the axis increases, so the polarized rays which pass through the cell undergo within this latter a substantial rotation of their plane of polarization. The difference between their plane of polarization and the plane of polarization of the polarizer 8 therefore becomes progressively greater, with the result that the light is increasingly attenuated.

Thus, the Pockels cell in which the induced birefringence results in rotatory power which increases from the center towards the periphery constitutes in conjunction with the crossed polarizers 7 and 8 a system having a transmission which decreases from the center to the periphery. A laser beam whose intensity decreases in the opposite direction, that is to say from the periphery towards the center, therefore has enhanced homogeneity at the exit of the polarizer 8.

The non-uniformity of the field within the interior of the cell 6 can be increased by modifying the internal diameter of the two annular electrodes 10 and 11. This makes it possible to adjust the characteristics of transmission of the cell in relation to the energy distribution of the laser beam to be corrected.

Inasmuch as this system is open only when the crystal 9 is excited by an electric field, it can evidently constitute a shutter for modulating high-amplitude laser pulsations as was the case with the previous embodiment. In fact, in the event of zero potential difference between the electrodes 10 and 11, the light passes through the crystal 9 without any change in polarization so that the light is not transmitted by the second polarizer whose plane of polarization is crossed with respect to that of the first polarizer.

The cell shown in FIG. 2 is a simple Pockels cell with a single crystal but there is nothing to prevent this latter from being replaced by a three-plate cell having two crystals disposed side by side, said crystals being separated by an annular central electrode and surrounded by two lateral electrodes which are also annular and electrically coupled, the principal crystallographic axis of said crystals being directed parallel to the lines of force of the electric field which can be produced by said electrodes. In this case, the optical path differences within the two crystals were added and the voltage applied is such that this difference along the axis is equal to $\lambda/4$.

Figure 3:
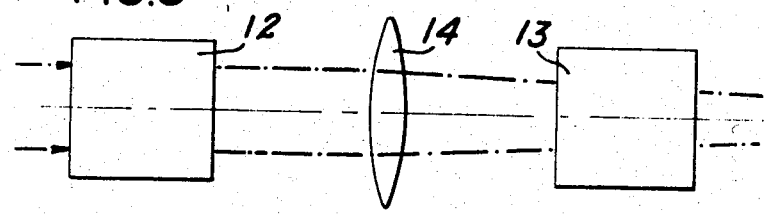
FIG. 3 illustrates a device according to the invention which makes use of a lens having a substantial radius of curvature and formed of birefringent material.

A third method of correcting lack of homogeneity of a laser beam consists as shown in FIG. 3 in placing on the path of said beam and between two polarizers 12 and 13 which are crossed at 90° a lens 14 having a thickness which decreases from the center to the periphery and which is formed of a uniaxial birefringent material such as quartz, the axis of said material being substantially perpendicular to said beam.

Under these conditions, a polarized light ray is subjected as it passes through the lens 14 to a rotation of its plane of polarization through an angle which depends on the thickness of the material being traversed, that is to say which is progressively greater towards the center of the lens. Consequently, if the thickness of the lens at its center is such that a polarized light ray which passes through said lens at this point along its axis is subjected to a rotation of its plane of polarization through an angle of approximately 90°, said ray is transmitted practically without attenuation by the polarizer 13 since its plane of polarization is substantially parallel to that of said polarizer. On the other hand, the rotation of the plane of polarization of the rays is smaller as these latter pass through the lens at a greater distance from the center and the difference between said plane of polarization and that of the polarizer 13 increases accordingly, with the result that the light becomes more and more attenuated.

Thus, the lens 14 whose rotatory power decreases from the center towards its periphery constitutes together with the polarizers 12 and 13 a system having a transmission which also decreases from the center towards the periphery. A laser beam whose intensity decreases in the opposite direction therefore undergoes an attenuation which increases with the distance from the axis, with the result that enhanced homogeneity of the beam is thus obtained at the exit of the polarizer 13.

The radius of curvature of the lens 14 which can be variable at each point must be sufficiently great for the reason which will now be explained. A light ray $y$ undergoes a change of direction which depends on the refractive index of the lens material. Inasmuch as this material is birefringent, there are therefore two refracted rays for one incident ray and the wave surface of the light beam is split into two at the exit of the lens. This disadvantage becomes negligible if on the one hand the difference between the ordinary and extraordinary refractory indexes of the material is small and if on the other hand the angles of incidence and of emergence of the light rays are of small value. The first condition depends only on the birefringent material which is selected, quartz being particularly suitable in this case. In regard to the second condition, it is obvious that this condition is satisfied simply by giving a substantial radius of curvature to the lens.

Figure 4:
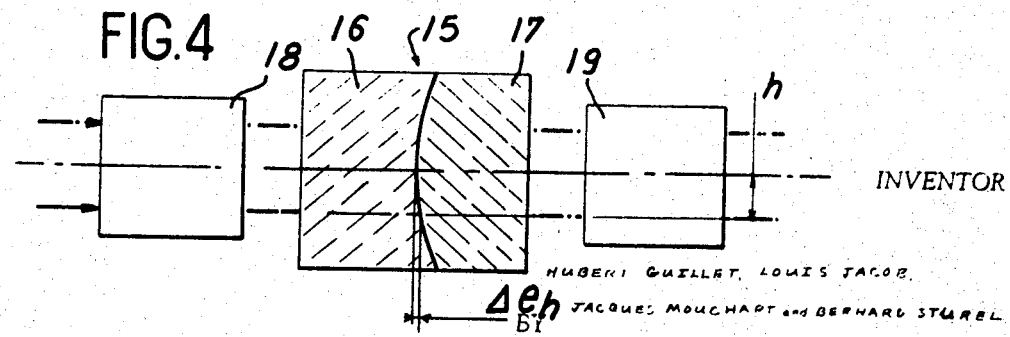
FIG. 4 illustrates a device according to the invention which makes use of a plate having parallel faces and constituted by a planoconvex lens and a planoconcave lens with rounded faces having complementary shapes and applied in contact with each other.

A fourth method of correcting lack of homogeneity of a laser beam consists as shown in FIG. 4 in having recourse to a Babinet compensator of a special type. This compensator 15 is made up of two optical components 16 and 17 having respectively the shape of a planoconcave lens and of a planoconvex lens, the rounded faces of which have complementary shapes. The rounded faces of said two lenses are applied against each other either by molecular adhesion or by means of a fluid having a suitably chosen optical index, thus forming a plate with parallel faces. Said lenses are formed of a uniaxial birefringent material which is usually quartz and positioned with respect to each other in such a manner as to ensure that their optical axes should be at right angles. The compensator 15 which is thus formed is placed on the path of the laser beam between two polarizers 18 and 19, the axes of which are parallel to each other and inclined at 45° to the optical axes of the lenses 16 and 17.

It is immediately apparent that, as it passes through the compensator 15, a polarized light ray undergoes a rotation of its plane of polarization which depends on the difference $\Delta e_h$ between the thickness of the two lenses at the distance $h$ from the axis. Under these conditions, if the shape of the lenses 16 and 17 is determined so as to ensure that they should have substantially the same thickness at the center and that the difference $\Delta e_h$ should increase at the same time as $h$, a polarized light ray which passes through the center of the compensator 15 does not undergo any rotation of its plane of polarization ; the polarizer 19 whose plane of polarization is parallel to that of the polarizer 18 therefore transmits the light ray practically without attenuation. On the other hand, the rays undergo a more substantial rotation of their plane of polarization as they pass through the compensator at a greater distance from the center and are attenuated to a correspondingly greater extent at the exit of the polarizer 19. A laser beam emitted by a rod whose "shell" is more highly pumped than the "core" therefore exhibits superior homogeneity after having traversed the polarizer 19.

It can readily be demonstrated that the intensity $I_h$ of an emergent light ray at the distance $h$ from the center is expressed by the relation:

$$I_h = a_h^2 \cos^2 \frac{2\pi \Delta e h (\mu_e - \mu_o)}{\lambda}$$

where:
$a_h$ represents the maximum amplitude of vibration of the light ray considered at the entrance of the compensator,
$\mu_e$ and $\mu_o$ are respectively the extraordinary and ordinary indexes of the lenses 16 and 17,
and $\lambda$ represents the wavelength of the light considered.

When the law of distribution of energy of a laser beam is known (namely the value of $a_h$ at each point), the above relation therefore makes it possible to determine at each point the value of $\Delta e_h$ which is conducive to homogeneous distribution of the light intensity at the exit.

It is acknowledged that difficulties may well be encountered in providing the lenses 16 and 17 with the profile which is made necessary by the relation given in the foregoing. For this reason, it may be found sufficient to obtain approximate compensation by determining $\Delta e_h$ in respect of a small number of distances $h$ and by adapting a constant radius of curvature which presents the highest compatibility with calculated values.

It is not essential to ensure that the compensator 15 should constitute a plate having a parallel plane face. The external faces of said compensator for the emergence and entry of the light rays can be rounded so that the compensator thus becomes an optical system which is either afocal (for narrowing or widening the beam) or alternatively divergent or convergent. In order to prevent splitting of the wave surface of the emergent beam as in the embodiment previously described, the entrance and exit faces of the compensator must have fairly substantial radii of curvature. Moreover, only one of the two lenses which constitute the compensator can be formed of a uniaxial material whilst the other lens is in that case fabricated from an isotropic material. Finally, the two lenses can be located at a distance from each other.

It will be understood that the present invention is not limited solely to the embodiments which have been described by way of example in the foregoing with reference to the accompanying drawings and that the scope of this patent also extends to alternative forms of either all or part of the arrangements described which remain within the scope of equivalent means as well as to all applications of such arrangements.

What we claim is:

1. A device for producing a beam of light having a uniform radial energy density, comprising:
a source emitting a beam of light having a radial energy density corresponding to a specific relationship with respect to said source; and
an optical system located in the path of said beam of light emitted by said source including an element having a radially variable polarization characteristic which varies inversely with respect to said relationship with respect to said source and first and second polarizers, the planes of polarization of which are perpendicular to each other, respectively disposed on each side of said element in the path of said light beam.

2. A device according to claim 1, wherein said element is a Faraday rotator which is constituted by a material having a Verdet constant and by a solenoid which surrounds said material.

3. A device according to claim 2, wherein said material is lead glass.

4. A device according to claim 1, wherein said element is a phase-shifting electrooptical cell having a non-uniform polarization changing field distributed therein.

5. A device according to claim 4, wherein said cell is constituted by a single crystal which exhibits the Pockels effect, said crystal being inserted between two annular electrodes and having a principal crystallographic axis directed parallel to the lines of force of the electric field which can be produced by said electrodes.

6. A device according to claim 4, wherein said cell is constituted by two single crystals which exhibit the Pockels effect and are placed side by side, said crystals being separated by an annular central electrode and surrounded by two lateral electrodes which are also annular and coupled electrically, the principal cyrstallographic axis of said crystals being directed parallel to the lines of force of the electric field which can be produced by said electrodes.

7. A device according to claim 1, wherein said element is a lens having a radially variable thickness and formed of a uniaxial material whose axis is substantially perpendicular to the direction of the light beam.

8. A device according to claim 1, wherein said element comprises two lenses each having a face which is complementary in shape to the other, at least one of said two lenses being formed of a uniaxial material.

9. A device according to claim 8, wherein said faces of the two lenses which have a complementary shape are applied in contact with each other.

10. A device according to claim 9, wherein the shapes of the lenses are respectively planoconcave and planoconvex in order to form a plate having substantially parallel plane faces.

11. A device according to claim 8, wherein both lenses are formed of a uniaxial material, the optical axis of one lens being perpendicular to the optical axis of the other lens.

12. A device for producing a beam of light having a uniform radial energy density comprising:
first means for generating a beam of light along an optical path, the energy density in a direction radial with respect to said path of which is governed by a predetermined characteristic;
a first polarizer located on said optical path for polarizing said beam of light in a first direction;
second means, disposed on said optical path, for receiving said beam of light which has been polarized in said first direction and for rotating the plane of polarization of said received beam of light by an amount inversely proportional in a direction radial with respect to said path to said predetermined characteristic governing said radial energy density; and
a second polarizer located on said optical path for polarizing the output of said second means in a direction perpendicular to said first direction of polarization provided by said first polarizer,
whereby the homogeneity of the light beam eminating from said second polarizer has a substantially uniform energy density distribution in a direction radial with respect to said optical path.

* * * * *